Feb. 15, 1927. 1,617,565
S. J. BENS
TREE SAWING APPARATUS
Filed April 23, 1921 4 Sheets-Sheet 1
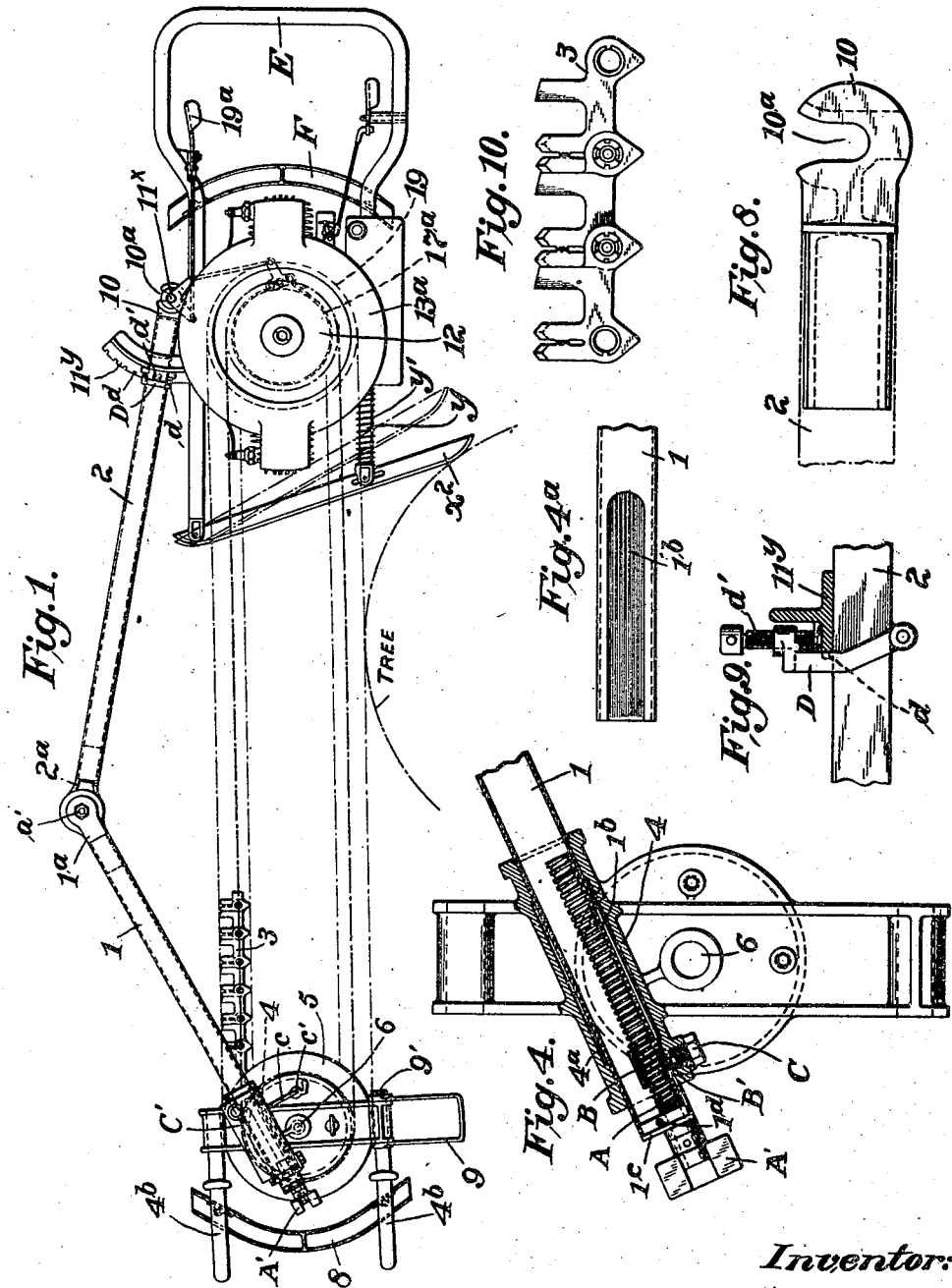
Inventor:
Samuel J. Bens,

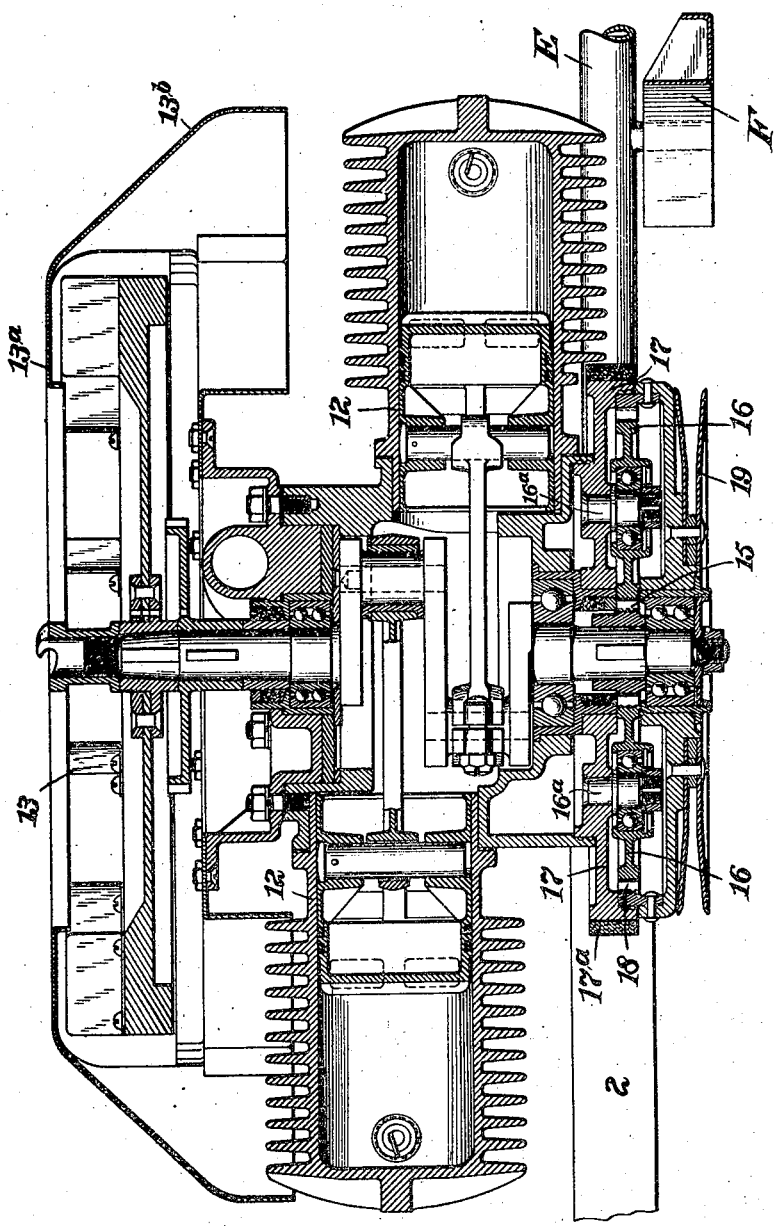

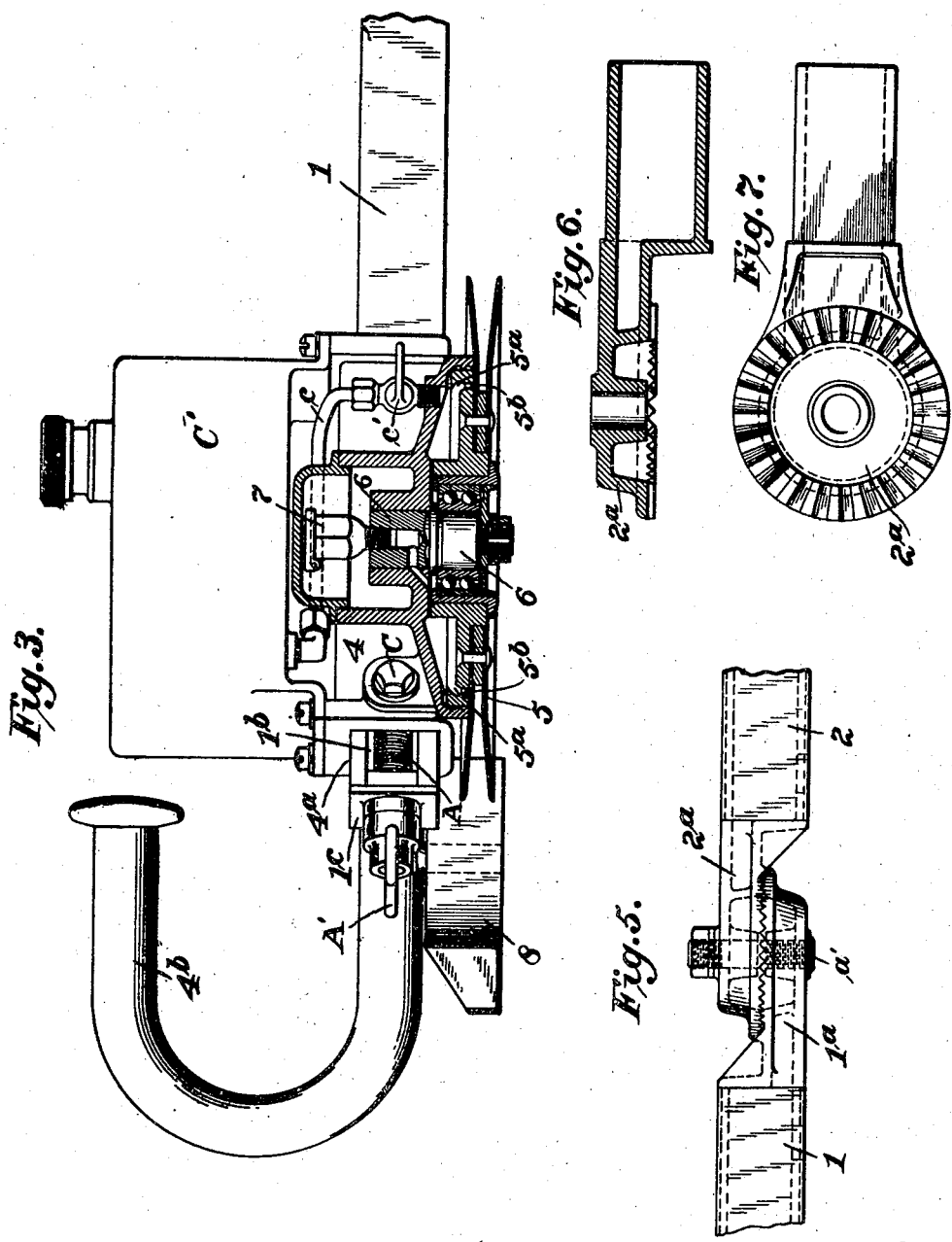

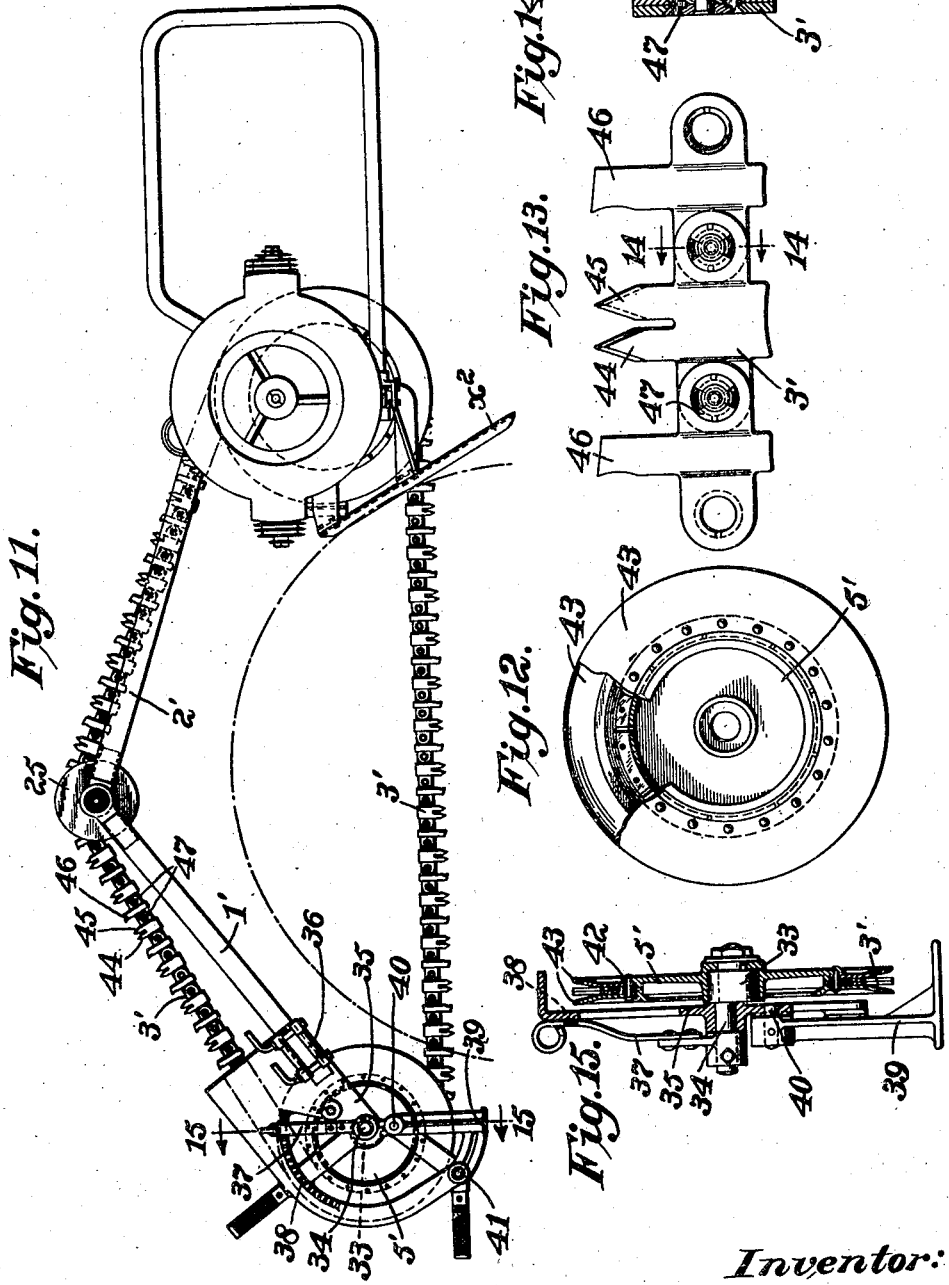

Patented Feb. 15, 1927.

1,617,565

UNITED STATES PATENT OFFICE.

SAMUEL J. BENS, OF HERKIMER, NEW YORK, ASSIGNOR TO CHAIN SAW CORPORATION, OF WILMINGTON, DELAWARE, A CORPORATION OF DELAWARE.

TREE-SAWING APPARATUS.

Application filed April 23, 1921. Serial No. 463,830.

My present invention relates to a portable power driven apparatus for sawing trees and logs, and aims to provide a simple, compact, durable and efficient machine capable of being easily handled by a couple of operators to rapidly and expeditiously cut logs or trees irrespective of the position, and one which can be readily conveyed from place to place.

The invention includes the novel features of construction and arrangement and combination of parts hereinafter described, the invention being defined by the appended claims.

In order that my invention may be better understood I have appended hereto several sheets of drawings illustrating several forms of my invention, in which drawings:—

Figure 1 is a plan view illustrating the preferred embodiment of my invention.

Fig. 2 is an enlarged transverse sectional iew of the motor end.

Fig. 3 is an enlarged sectional detail of the opposite end.

Fig. 4 is an enlarged sectional detail showing the detachable and adjustable frame bar connection at the idle pulley end.

Fig. 4ª is a detail view of the outer end of frame bar 1.

Figs. 5, 6 and 7 are detail views of the lock joint connecting frame bars 1 and 2.

Fig. 8 is a detail of the engaging end of bar 2.

Fig. 9 is a detail of the bar clamp.

Fig. 10 is a side elevation of a portion of chain saw used in this form of apparatus.

Fig. 11 is a view similar to Fig. 1, but showing a modification.

Fig. 12 is a detail view showing the idler of Fig. 11 partly in side elevation and partly broken away.

Fig. 13 shows in side elevation a section of a chain saw suitable for use in this form of my invention.

Fig. 14 shows a section of the saw on the line 14—14, Fig. 13.

Fig. 15 is a section on line 15—15 of Fig. 11.

Referring by reference characters to these drawings, the numerals 1 and 2 designate frame bars, preferably hollow and square in cross section, which are adjustably pivoted together. and which support at their outer ends the pulleys for carrying and driving the chain saw 3 in the manner hereinafter described.

The frame bars 1 and 2 are preferably connected by providing them with socket members 1ª and 2ª in which the ends of the bars are rigidly held, which socket members are provided with overlapping plate or disc members having serrated faces bolted together by means of the bolt a'.

The ends of both frame bars 1 and 2 are detachably connected with the chain saw pulley carrying parts to enable them to be readily removed and replaced by longer or shorter bars, according to the sizes of trees to be operated on.

The form of connection for the end of bar 1 is preferably such as to enable the bar to be adjusted longitudinally for chain tightening purposes to secure finer adjustments than can be obtained by the angular adjustment of the frame bars relative to each other.

To this end the frame bar slidably and removably seats in or engages a square passageway 4ª in the frame 4 which carries the idle pulley 5, which pulley 5 supports one end of the loop of the endless chain saw, indicated at 3. The bar 1 has a cut away portion 1ᵇ at one side and it is provided with an end cap 1ᶜ having a portion telescoping into the end of the bar and held therein by a transverse pin 1ᵈ. An adjusting screw A lies within the bar and has a reduced end extending through and rotatable in an opening in the end cap, such end being provided with screw turning means such as the winged member indicated at A'.

The portion of the screw within the bar 1 engages the interior threads of a stationary nut member B which has a lateral boss B' projecting through the opening 1ᵇ of the bar 1 and provided with a threaded opening tapped therein designed to receive the clamping screw C by which the nut is rigidly clamped to frame member 4.

Thus by turning the screw A by means of the wing member A', the engagement of the screw with the stationary nut B will effect longitudinal adjustment of the bar 1, while by removing or driving out the pin 1ᵈ and disconnecting the cap, the frame bar may be removed without disturbing the adjusting means just described.

The idle pulley 5 is journaled upon a shaft 6 carried by the frame member 4, and is provided with lubricating means for the bearing comprising a grease cup 7 and lubricant passages, as shown in Fig. 3. The housing 4 is provided with handles 4$^b$ preferably of a curved shape, as shown, and provided with terminal knobs.

To prevent accident to the operator in case of breakage of the saw, I provide a guard 8, carried by the shanks of the handles 4$^b$, and the saw is kept from contacting with the ground in vertical cutting by a shoe 9, pivoted at 9' so as to fold upward when desired.

The pulley 5 and chain are preferably of the construction shown in application filed by me of even date herewith.

The pulley 5 is also preferably provided with an inwardly projecting flange providing an internal annular channel 5$^a$, into which oil may be fed in any suitable manner and from which it will pass by centrifugal action through ports 5$^b$ to the chain channel to lubricate the saw.

Oil may be supplied to this channel from tank C' through pipe c, provided with cut off valve c'.

The frame bar 2 carries at its outer or lower end a coupling member 10 which is provided with a transverse slot 10$^a$ designed to hook under or engage a transverse pin 11$^x$ carried by the motor frame and forming a detachable pivotal connection.

An intermediate part of the frame bar 2 is adjustably held to the motor frame or casing and my preferred form of adjustable connection comprises a quadrant 11$^y$ carried by the motor frame to which the said intermediate portion of the bar is adjustably clamped.

My preferred form of clamp is illustrated in detail in Fig. 9 and comprises a swinging member D having ribs d designed to engage notches in the segment and having a screw locking clamp d' designed to cooperate with the segment to hold the ribs in said recesses.

By loosening the screw, the clamp or locking device may be swung out of the way to permit the bar to be unhooked or disconnected from the motor frame.

The motor frame is provided with a handle E, preferably of the form shown, and also with a chain guard F.

The motor is preferably an internal combustion engine of the air cooled type indicated at 12, and is provided with a cooling fan 13 driven from the engine shaft, as shown in Fig. 2, and provided with a housing 13$^a$ having portions 13$^b$ for deflecting the air against the cylinders.

The engine shaft carries pinion 15 which meshes with planetary gears 16 journaled on stub shafts 16$^a$ carried by brake drum 17, and the planetary gears in turn mesh with an internal rack or gear 18 fast on or connected to the driving pulley 19, which driving pulley is shown as of the form and construction disclosed in an application filed of even date herewith. The brake drum and driving pulley are both rotatable about the engine shaft, being journaled as clearly shown in Fig. 2, and the brake drum is encircled by a brake band 17$^a$ operated by suitable rod and bell crank connections, as shown in Fig. 1, from the operating lever or handle 19$^a$. When the brake band is loose, the brake drum is free to rotate and the planetary gears simply roll around without driving effect on the chain pulley, but when the band is tightened to hold drum 17 stationary and the planetary gears against orbital movement, the annular rack and chain pulley are driven, but at a much reduced speed.

To enable the apparatus to be properly steadied and guided, especially at the commencement of the sawing operation, I provide a bar $x^2$ having a knife edge.

This knife is pivoted at its rear end on a bar which may conveniently be formed as an extension of the handle, and its free end is yieldingly pressed towards the left by a slidable rod $y$ under the influence of spring $y'$.

In the construction shown in Figs. 11 to 15 inclusive, the idler pulley 5' is mounted on an eccentric 33 carried by the shaft 34 journaled in the support 35, which support is secured to the frame member 1' by the clamping device 36. Secured to the shaft 34 is a crank-arm 37, the turning of which turns the eccentric 33 so as to adjust the axis of the pulley 5' relatively to the axis of the driving pulley, this being a fine adjustment which is made after the angular position of the frames 1' and 2' are adjusted relatively to one another. The support 35 is provided with a notched quadrant 38 which holds the handle 37 in any position to which it may be moved. A shoe 39 is pivotally connected to the support 35 at the point 40 and is held in position by a clamping nut 41 which engages an extension from the shoe.

The driving and idler pulleys have a flange 42 to which are riveted two plates 43 which form between them a flaring opening between which the saw 3' travels. The space at the inner portion of said opening is of such dimensions as to bind upon the saw and thus drive the same by reason of the frictional engagement. The saw itself is made up of a series of links having cutting teeth 44 and 45 and clearers 46, the links being secured together by suitable connections 47, more particularly shown and described in a companion application.

In the form shown in Fig. 11, I provide an additional guide or idle pulley 25 at the angle of the frame bars around which the inactive portion of the chain saw passes.

In all the frames shown and described herein, adjustments may be made so as to bring the driving and idler pulleys nearer together or farther apart. One purpose of this is to enable the operator to use saws of different lengths for sawing trees of different sizes. Thus if he is going to a section where the timber is small, he will take along a shorter saw and be able to apply it to the frame, adjusting the frame properly for the length of saw which he may have at hand. In all the forms the peripheries of the driven and idler pulleys are entirely exposed so that when the two are sufficiently near together the saw can be put in place by a simple sidewise movement without moving any parts.

In using the saw for felling a tree, an undercut is first sawed out by making two cuts at an angle to one another. In making these cuts the knife edge of the bar $x^2$ is brought into contact with the tree and the pull of the saw, the cutting edge of which travels toward the outer end of the bar $x^2$, draws the apparatus toward the tree so that the knife edge of the bar $x^2$ bites into the tree, thus steadying the mechanism. After this undercut is formed the apparatus is removed to the other side of the tree and a straight saw cut is formed therein directly toward the undercut until the tree falls. This bar $x^2$ is positioned slightly above the saw so as to be out of line with its travel.

The outer end of the bar $x^2$ is held in forward position by a spring $y$ when the apparatus is not in engagement with the tree and is therefore more clearly in sight of the operator during the time when he is positioning the mechanism.

After the sawing is begun, however, it is automatically retracted to the position shown in dotted lines and is therefore nearer the motor so as to enable the maximum length of the saw to be used in cutting. The yielding action of this bar $x^2$ due to the presence of the spring $y'$ also results in a shock absorbing action, relieving the apparatus in case the saw strikes a hard knot or other obstacle.

The form of apparatus shown in Fig. 1 is the preferred form both as to the frame and as to other features.

As will be evident to those skilled in the art, my invention permits of various modifications without departing from the spirit thereof or the scope of the appended claims.

What I claim is:

1. A portable apparatus for felling trees and cutting them into the lengths and the like, comprising a frame, a saw carried thereby having an endless travel in one direction, with means for operating it, and a knife edge bar supported from said frame and arranged transversely to and projecting beyond the cutting run of the saw.

2. A portable apparatus for felling trees and cutting them into the lengths and the like, comprising a frame, a saw carried thereby having an endless travel in one direction, with means for operating it, and a spring pressed knife edge bar supported from said frame and arranged transversely to and projecting beyond the cutting run of the saw.

3. A portable apparatus for felling trees and cutting them into the lengths and the like, comprising a frame, a saw carried thereby having an endless travel in one direction, with means for operating it, and a knife edge bar supported from said frame and arranged transversely to and projecting beyond the cutting run of the saw, said knife edge bar having its rear end articulated on a fixed pivot, and a spring for forcing the opposite end towards the cutting zone of the saw.

4. In combination, a saw-frame, a saw blade carried thereby and having an exposed run, and a guiding member extending substantially at right angles to the exposed run of the saw blade and having a cutting edge adapted to cut into a tree and to aid in supporting the saw as the blade moves through a tree in felling the same.

In testimony whereof I affix my signature.

SAMUEL J. BENS.